US008543944B2

(12) United States Patent
Dwyer et al.

(10) Patent No.: US 8,543,944 B2
(45) Date of Patent: Sep. 24, 2013

(54) FAST EDGE ROUTING FOR INTERACTIVE DIAGRAMMING

(75) Inventors: Timothy G. Dwyer, Seattle, WA (US); Lev Nachmanson, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 363 days.

(21) Appl. No.: 12/814,510

(22) Filed: Jun. 14, 2010

(65) Prior Publication Data

US 2011/0307838 A1    Dec. 15, 2011

(51) Int. Cl.
*G06F 3/048*      (2013.01)

(52) U.S. Cl.
USPC .......................................................... 715/854

(58) Field of Classification Search
USPC .......................................................... 715/778
See application file for complete search history.

(56) References Cited

U.S. PATENT DOCUMENTS

| 5,450,535 | A | 9/1995 | North |
| 5,764,239 | A | 6/1998 | Misue et al. |
| 5,943,062 | A | 8/1999 | Schanel |
| 2003/0033582 | A1 | 2/2003 | Klein et al. |
| 2006/0290697 | A1* | 12/2006 | Madden et al. ............... 345/440 |

OTHER PUBLICATIONS

Tan et al: Visibility-Graph-based Shortest-Path Geographic Routing in Sensor Networks, Published in INFORCOM May 11, 2009.*
Mark de Berg: "Computational Geometry, Algorithms and Applications, second edition", published by Springer 2000.*
Lai, Wei., "Layout Adjustment and Boundary Detection for a Diagram", Retrieved at << http://ieeexplore.ieee.org/stamp/stamp.jsp?arnumber=00934697 >>, Computer Graphics International, Proceedings of the International Conference on Computer Graphics, Jul. 3-6, 2001, pp. 351-354.
Eades, et al., "Straight-Line Drawing Algorithms for Hierarchical Graphs and Clustered Graphs", Retrieved at << http://www.cs.uoi.gr/~fpechliv/master/Related%20Work/About%20Graphs/Algorithmica.pdf >>, Algorithmica, vol. 44, No. 1, 2006, pp. 1-32.
Holten, et al., "Force-Directed Edge Bundling for Graph Visualization", Retrieved at << http://www.win.tue.nl/~dholten/papers/forcebundles_eurovis.pdf >>, 11th Eurographics/IEEE-VGTC Symposium on Visualization (Computer Graphics Forum, Proceedings of EuroVis), vol. 28, No. 3, 2009, pp. 8.
"Diagram Edges 1.0 Requirements Specification", Retrieved at << http://software.topcoder.com/catalog/document?id=24670944 >>, pp. 1-4.

(Continued)

*Primary Examiner* — William Bashore
*Assistant Examiner* — Hien Duong (57) ABSTRACT

An edge routing system is described herein that uses a spatial decomposition to achieve faster routing, and more quickly generates a sparse visibility graph using a cone spanner. The system provides two approaches that can be used separately or in combination to achieve faster—and hence more scalable and more interactive—edge routing using approximate shortest paths. The first approach uses a spatial decomposition of the nodes in a graph, moving them slightly to obtain strictly disjoint convex hulls around groups of nodes, and then computing visibility graphs over these composite hulls rather than individual nodes. The second approach generates a sparse visibility-graph spanner to accelerate the process of producing the visibility graph. The system allows high quality obstacle avoiding edge routing for large diagrams in interactive diagramming applications where very fast refreshes of routing are used with many nodes moving at the same time.

17 Claims, 8 Drawing Sheets

(a) The edge routing 510    (b) The corresponding KD-tree with compound obstacles enclosed. 550

(56) References Cited

OTHER PUBLICATIONS

Andersen, et al., "Drawing Power Law Graphs using a Local/Global Decomposition", Retrieved at << http://www.math.sc.edu/~lu/papers/draw.pdf >>, Algorithmica, vol. 47, No. 4, Mar. 2007, pp. 1-16.
"Approximate Nearest-Neighbors in High-Dimensional Metric Spaces", Retrieved at << http://www.kavrakilab.org/robotics/Proximity >>, Retrieved Date: Jan. 29, 2009, pp. 3.
McGregor, Andrew., "Graph Mining on Streams", Retrieved at << http://www.cs.umass.edu/~mcgregor/papers/08-graphmining.pdf >>, Encyclopedia of Database Systems, 2009, pp. 5.
Dwyer, et al., "Fast Edge-Routing for Large Graphs", Retrieved at << http://www.cs.umass.edu/~mcgregor/papers/08-graphmining.pdf >>, 17th International Symposium on Graph Drawing, Sep. 22-25, 2009, pp. 15.
Dobkin, et al., "Implementing a General-Purpose Edge Router", Retrieved at << http://www.cs.princeton.edu/~dpd/Papers/DGKN97.pdf >>, Lecture Notes in Computer Science, vol. 1353, Proceedings of the 5th International Symposium on Graph Drawing, Sep. 18-20, 1997, pp. 8.
Freivalds, Karlis., "Curved Edge Routing", Retrieved at << http://www.gradetools.com/karlisf/curved.html >>, Lecture Notes in Computer Science, vol. 2138, Proceedings of the 13th International Symposium on Fundamentals of Computation Theory, Aug. 22-24, 2001, pp. 1-12.
Wybrow, et al., "Incremental Connector Routing", Retrieved at << http://www.google.co.in/url?sa=t&source=web&ct=res&cd=1&ved=0CBUQFjAA&url=http%3A%2F%2Fciteseerx.ist.psu.edu%2Fviewdoc%2Fdownload%3Fdoi%3D10.1.1.87.962%26rep%3Drep1%26type%3Dpdf&rct=j&q=Incremental+connector+routing&ei=R-7LS-DqJJv80wTF2ay8BA&usg=AFQjCNFRsdw-zssItiMuCLUEzX0HcnI5Rg >>, In Proceedings International Symposium on Graph Drawing (GD'05), LNCS, vol. 3843, 2006, pp. 1-12.
Ghosh, et al., "An Output-Sensitive Algorithm for Computing Visibility Graphs", Retrieved at << http://ieeexplore.ieee.org/stamp/stamp.jsp?tp=&arnumber=4568251 >>, SFCS, Proceedings of the 28th Annual Symposium on Foundations of Computer Science, Oct. 12-14, 1987, pp. 11-19.
Clarkson, Kenneth L., "Approximation Algorithms for Shortest Path Motion Planning", Retrieved at << http://citeseerx.ist.psu.edu/viewdoc/download?doi=10.1.1.145.8507&rep=rep1&type=pdf >>, Annual ACM Symposium on Theory of Computing, Proceedings of the nineteenth annual ACM symposium on Theory of computing, 1987, pp. 1-22.

* cited by examiner

FAST EDGE ROUTING FOR INTERACTIVE DIAGRAMMING

BACKGROUND

Most network diagrams (graphs) that people use for visualization of various concepts have nodes with associated textual or graphical content. For example, in Unified Modeling Language (UML) class diagrams nodes are drawn as boxes with textual content describing class attributes or methods. As another example, in metabolic pathway diagrams nodes representing chemical compounds may have long textual labels or a graphic representation of the molecular structure.

Routing refers to paths taken by connectors to connect nodes. If edges (connectors) that are not directly connected to a particular node are drawn over that node then the label may be obscured. Alternately, if edges are drawn behind a node then the reader may erroneously assume a connection exists to the node. Routing edges around nodes avoids this ambiguity. Therefore, to automatically produce high quality drawings of network diagrams it is important to find routes for the edges that do not intersect node boundaries.

Recent work in this area involves finding shortest paths in a tangent-visibility graph. However, construction of the full tangent-visibility graph is computationally expensive, at least quadratic time in the number of nodes. This makes such existing tangent-visibility-graph routing schemes infeasible for interactive diagramming applications involving large diagrams with hundreds or thousands of nodes. Some layout algorithms, such as the level scheme for directed graphs or the topology-shape-metrics approach for orthogonal graph drawing consider edge routing as an integral step in the layout process. However, the popular force-directed family of layout algorithms for general undirected graphs does not usually consider routing edges around node hulls (except perhaps as a post-processing step). Recent work has proposed force-directed methods that are able to preserve the topology of a given edge routing, but a feasible initial routing is still found using a standard routing algorithm. For graphs with hundreds of nodes, the quadratic (in the number of nodes) or worse computational cost of constructing the visibility graph can be too slow, especially for interactive applications where the layout is changing significantly from iteration to iteration.

SUMMARY

An edge routing system is described herein that uses a spatial decomposition to achieve faster routing, and more quickly generates a sparse visibility graph using a cone spanner. The system provides two approaches that can be used separately or in combination to achieve faster—and hence more scalable and more interactive—edge routing using approximate shortest paths. The first approach uses a spatial decomposition of the nodes in a graph, moving them slightly to obtain strictly disjoint convex hulls around groups of nodes, and then computing visibility graphs over these composite hulls rather than individual nodes. The second approach generates a sparse visibility-graph spanner to accelerate the process of producing the visibility graph. The two techniques are complementary, that is they can be used together to obtain even faster routing. The system allows high quality obstacle avoiding edge routing for large diagrams (with hundreds or thousands of nodes) or in interactive diagramming applications where very fast refreshes of routing are used with many nodes moving at the same time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An edge routing system is described herein that uses a spatial decomposition to achieve faster routing, and more quickly generates a sparse visibility graph using a cone spanner. The system provides two approaches that can be used separately or in combination to achieve faster—and hence more scalable and more interactive—edge routing using approximate shortest paths. The first approach uses a spatial decomposition of the nodes in a graph, moving them slightly to obtain strictly disjoint convex hulls around groups of nodes, and then computing visibility graphs over these composite hulls rather than individual nodes. The second approach generates a sparse visibility-graph spanner to accelerate the process of producing the visibility graph. The two techniques are complementary, that is they can be used together to obtain even faster routing. Prior to this, high quality obstacle avoiding edge routing has not been considered for large diagrams (with hundreds or thousands of nodes) or in interactive diagramming applications where very fast refreshes of routing are used with many nodes moving at the same time.

To produce high quality drawings of graphs with nodes drawn as shapes it is helpful to find routes for the edges that do not intersect node boundaries. Recent work in this area involves finding shortest paths in a tangent-visibility graph. However, construction of the full tangent-visibility graph is expensive, at least quadratic time in the number of nodes. The edge routing system significantly increases the speed of routing edges and producing a visibility graph so that dynamic routing is feasible for much larger graphs. The method of a spatial decomposition to achieve faster routing of edges/connectors has not previously been applied in diagramming applications. In addition, the system leverages the idea that nodes can be moved a little (i.e., in such a way that the diagram layout is not significantly altered) to allow for much more efficient spatial decomposition and routing. Finally, the system uses a cone spanner of the visibility graph to achieve faster routing in diagramming applications. Thus, the system routes edges much faster than previous techniques while producing a visibility graph that is a close approximation of a longer, optimal routing solution.

The most expensive part of previous routing schemes $O(n^2 \log n)$ construction of a tangent-visibility graph over n nodes with convex boundaries. The edge routing system reduces complexity by first simplifying the graph over which routing occurs using a spatial partitioning scheme. The system replaces groups of nodes (especially those that are far from the end nodes of the edge being routed) with their convex hulls, thus reducing the number of obstacles to consider in construction of the visibility graph.

The system obtains a recursive spatial partitioning of the nodes such that the convex hulls of the nodes in each partition are not overlapping with their siblings in the partition hierarchy. One method for doing this is with a KD-Tree data structure. The system processes the KD-tree bottom up building convex hulls of each internal node and for each pair of siblings in the tree, moving them apart to remove overlap between their convex hulls. The slight movement allows for easier routing without significantly changing the visual appearance of the graph. For each pair of KD-Tree leaf nodes the system builds a minimal visibility graph only over the node boundaries in the leaf nodes and the highest level siblings of the ancestors of these leaves.

To generate the actual visibility graph quickly the system uses so-called Yao graphs that are built by using fans of cones. A fan of cones is constructed at each vertex of an obstacle and only one edge of the visibility graph is chosen per cone. The resulting spanner graph is very sparse (contains few edges), yet in spite of the graph sparseness one can choose angle $\alpha$ such that for each shortest path in the full visibility graph the length of the corresponding shortest path in the spanner is at most 1+$\epsilon$ the length of the former. The system constructs the spanner graph by a direct method rather than previous methods of building a conic Voronoi diagram first.

Figure 1:
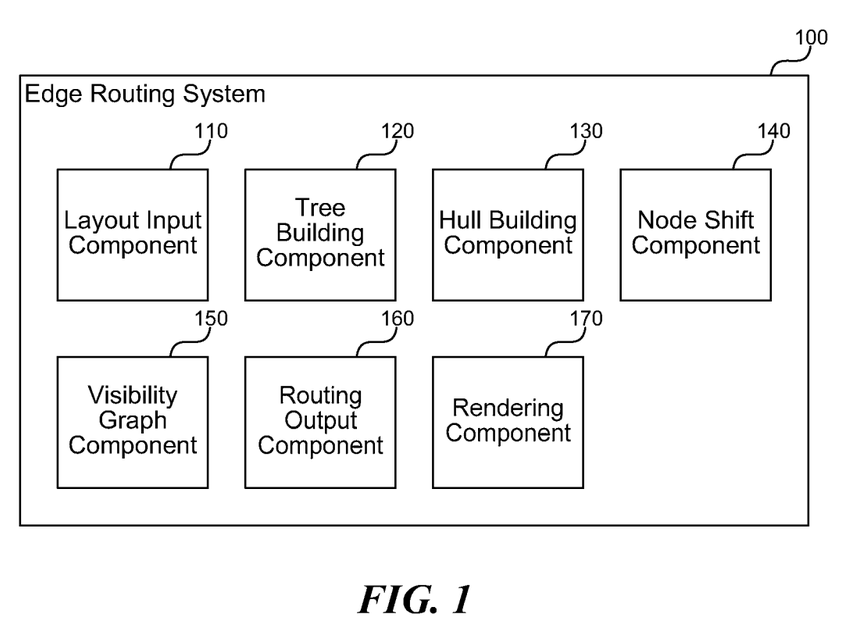
FIG. 1 is a block diagram that illustrates components of the edge routing system, in one embodiment.

FIG. 1 is a block diagram that illustrates components of the edge routing system, in one embodiment. The system 100 includes a layout input component 110, a tree building component 120, a hull building component 130, a node shift component 140, a visibility graph component 150, a routing output component 160, and a rendering component 170. Each of these components is described in further detail herein.

The layout input component 110 receives a layout for which to plan the routing of edges for connected nodes in a graph. The layout may be produced by user manipulation of the nodes in a user interface or by automated processing of the nodes by other components (not shown herein). The edge routing system 100 begins with a starting configuration of nodes obtained with any layout algorithm. For example, one common layout algorithm is a fast-force directed approach. The bounding boxes of nodes can be initially overlapping as overlaps can be removed by the system 100. Upon receiving the layout, the system 100 invokes the KD-tree building component 120 to build a KD-tree structure for the initial node positions.

The tree building component 120 builds a tree data structure that describes the relationship of nodes in the layout. One type of tree that can be used with the system 100 is a KD-tree. A KD-tree partitions a space by making a series of binary splits. For example, given an arbitrary arrangement of points, a KD-tree may be produced by initially splitting the arrangement down the middle (vertically or horizontally), and then placing each of the points that fall on one side in one half of the tree, and all of the nodes that fall on the other in the other half of the tree. Further splitting of the resulting halves can then be performed until the points are suitably partitioned (e.g., until each partition contains at most a desired threshold number of nodes). The component can use various heuristics to determine where to place the partition. On method is to use the median element in a list of nodes sorted by x or y coordinates. Using the median element produces a balanced tree, which is often useful for reducing the overall complexity of the routing task.

The hull building component 130 groups nodes so that construction of a visibility graph can consider groups instead of individual nodes to yield fewer obstacles. In some embodiments, the component 130 replaces groups of nodes with their convex hulls, thus reducing the number of obstacles to consider in construction of the visibility graph. The system 100 processes the KD-tree bottom up building convex hulls of each internal node and for each pair of siblings in the tree. In some embodiments, the hull building component 130 invokes the node shift component 140 to move nodes slightly apart to remove any overlap between convex hulls.

The node shift component 140 shifts nodes in the graph to remove overlaps between groups generated by the hull building component 130. The slight movement allows for easier routing without significantly changing the visual appearance of the graph. The node shift component 140 may employ a threshold level of movement that places an upper bound on how far nodes are moved. Users may not want the visual layout of the graph substantially modified, so the component 140 attempts to keep shifts slight to simplify the routing task without unduly changing the layout's appearance. Nevertheless, even slight node movements can make a big difference in the ability to create groups of nodes.

The visibility graph component 150 produces a visibility graph over the remaining nodes and groups of nodes. For each pair of KD-Tree leaf nodes the system 100 builds a minimal visibility graph only over the node boundaries in the leaf nodes and the highest level siblings of the ancestors of these leaves. To generate the actual visibility graph quickly the system 100 uses so called Yao graphs which are built by using fans of cones as described further herein. A fan of cones is constructed at each vertex of an obstacle and only one edge of the visibility graph is chosen per cone. The resulting spanner graph is very sparse (contains few edges), yet in spite of the graph sparseness one can choose angle $\alpha$ such that for each shortest path in the full visibility graph the length of the corresponding shortest path in the spanner is at most 1+$\epsilon$ the length of the former. The system constructs the spanner graph by a direct method rather than previous methods of building a conic Voronoi diagram first.

The routing output component 160 provides the resulting visibility graph to a renderer for displaying visual output of the routing process to a user. The system 100 may be implemented as a separate component (e.g., a MICROSOFT™.NET class) that can be invoked by existing diagramming applications. Alternatively or additionally, the system 100 may be built into a diagramming application to perform fast edge routing. The system 100 receives a node layout as input and produces a visibility graph as output. The rendering component 170, which may or may not be part of the system 100, can use the visibility graph to draw the appropriate visual representation of nodes and edges on the screen or other rendering surface (e.g., a printed view).

The rendering component 170 renders the nodes and edges of the graph upon completion of routing. The rendering component 170 may display a canvas that contains each node and the connections (edges) between the nodes according to a path determined by the processing described herein. The rendering component 170 may include controls for interaction with the user, so that the user can move nodes, establish and remove connections, and perform other editing of the graph. Upon each change, the rendering component 170 may invoke the system 100 to update edge routing. This produces a dynamic, interactive display that the user can manipulate and with which the user can view the results of changes quickly. Prior systems are not fast enough with routing to allow this kind of interactivity as the number of nodes becomes large (e.g., hundreds or more nodes).

The computing device on which the edge routing system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
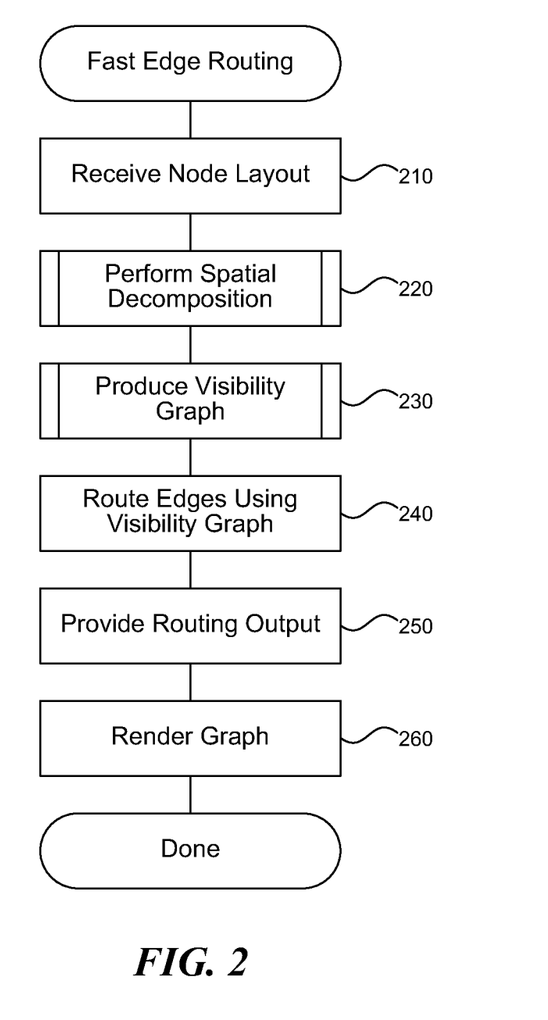
FIG. 2 is a flow diagram that illustrates processing of the edge routing system to perform fast edge routing for a graph, in one embodiment.

FIG. 2 is a flow diagram that illustrates processing of the edge routing system to perform fast edge routing for a graph, in one embodiment. Beginning in block 210, the system receives a layout of nodes for which the edges are to be routed to avoid the nodes. For example, the system may receive the layout from a diagramming application that is routing the edges for display to a user in a user interface. The application may provide the nodes to the system in a variety of different data structures, such as a list. The nodes may have arbitrarily shaped boundaries, and may have been positioned either by an automatic layout algorithm or manually by the user.

Continuing in block 220, the system performs spatial decomposition on the received layout of nodes to reduce a number of obstacles to consider during routing between each connected pair of nodes. This process is described further with reference to FIG. 3. Continuing in block 230, the system produces a visibility graph based on the reduced number of obstacles. The visibility graph identifies where obstructions exist and specify areas where edges can and cannot be routed to remain visible. This process is described further with reference to FIG. 4. Continuing in block 240, the system routes the edges to avoid the nodes in accordance with the produced visibility graph. The routing places the edges in a path that does not intersect with any node boundary, and that approximates a shortest path through the graph. The system uses cone spanning to reduce the computational complexity of producing the visibility graph, and thus provides a faster, but potentially more approximate (depending on a selected cone angle) solution.

Continuing in block 250, the system provides the routing output for rendering. For example, the system may provide a data structure in response to invocation of a module in which the system is implemented, wherein the data structure specifies the determined edge routing. Continuing in block 260, the system renders the graph based on the layout of nodes and the determined routing of edges. For example, the system may display the nodes and edges to a user in the user interface of a diagramming application. After block 260, these steps conclude.

Figure 3:
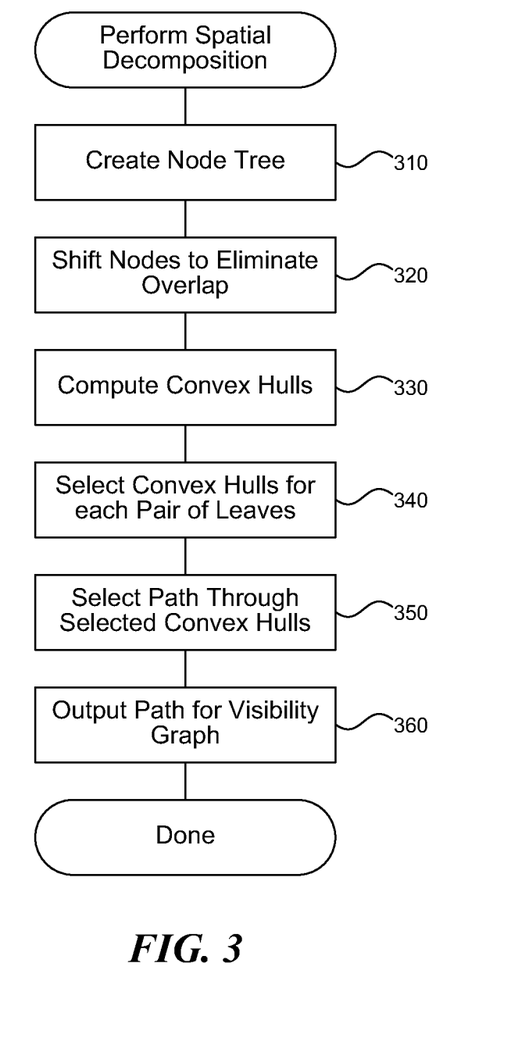
FIG. 3 is a flow diagram that illustrates processing of the edge routing system to perform spatial decomposition to simplify a routing task for a graph, in one embodiment.

FIG. 3 is a flow diagram that illustrates processing of the edge routing system to perform spatial decomposition to simplify a routing task for a graph, in one embodiment. Beginning in block 310, the system creates a tree that holds each of the nodes in a received graph layout. The tree may include KD-tree that partitions the nodes into one or more partitions based on a binary division of the nodes by coordinates. In some embodiments, the system stores a sorted list of nodes by coordinates in each dimension, and selects a median node within the sorted list as the coordinate for partitioning the remaining nodes. The resulting KD-tree is balanced and provides one or more groupings of nodes based on their location within the graph.

Continuing in block 320, the system optionally shifts nodes to eliminate any overlap between node shapes. Although often treated as points, nodes may have arbitrary shapes that can overlap even though node centers are reasonably distant. The system moves nodes to ensure that no two nodes have overlapping boundaries and so that the convex hulls of groups of nodes will not overlap. Non-overlapping boundaries simplify the process of routing. The system can process the nodes to determine overlap in a bottom up traversal of the KD-tree.

Continuing in block 330, the system computes one or more convex hulls based on one or more groupings of nodes in the created tree. The convex hull provides a larger virtual node that can be used for routing rather than the original individual nodes. The system processes each KD-tree node in a bottom up manner to compute convex hulls around the boundaries of the constituent children. The result is a balanced hierarchy of disjoint and nested convex hulls that the system can use to simplify routing between any two given nodes. Continuing in block 340, the system selects convex hulls for routing between each pair of leaves in the tree. The result is a minimal set of visibility graph obstacles that include one or more complex hulls of nodes between the pair of leaves as well as any descendant leaves that are contained within the same branch as the pair of leaves and thus not in a convex hull. Using convex hulls may reduce the number of obstacles around which to route by multiple orders of magnitude, thereby speeding up the routing process.

Continuing in block 350, the system selects a path for traversing the graph between each pair of connected nodes based on the selected convex hulls. The selected convex hulls specify a path through which to route the edge between two nodes, and the visibility graph process described herein refines the path of the edge to avoid intersection with any obstacles. Continuing in block 360, the system outputs the selected path for production of a visibility graph to determine a final route for each edge. The system may use various methods of producing a visibility graph, such as the complementary process described with reference to FIG. 4. After block 360, these steps conclude.

Figure 4:
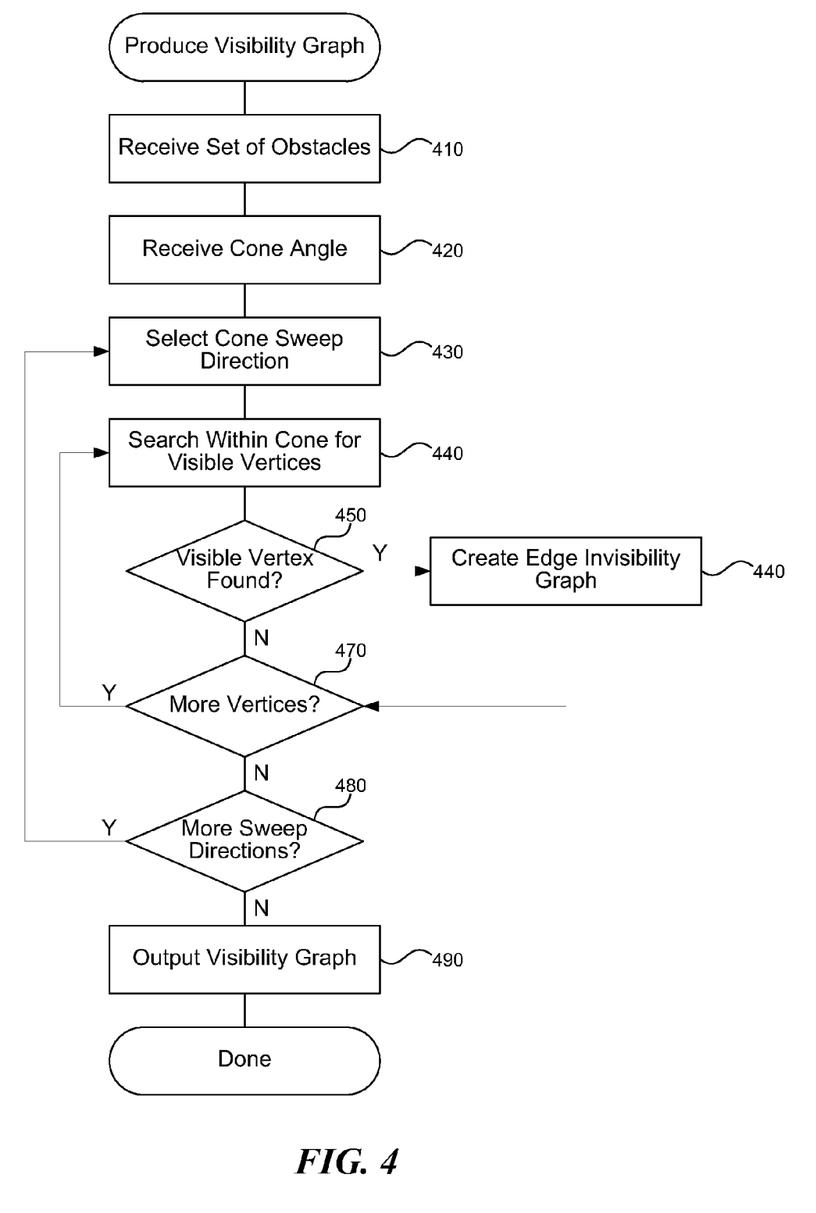
FIG. 4 is a flow diagram that illustrates processing of the edge routing system to produce a visibility graph over a set of nodes, in one embodiment.

FIG. 4 is a flow diagram that illustrates processing of the edge routing system to produce a visibility graph over a set of nodes, in one embodiment. Beginning in block 410, the system receives a graph specification that includes at least one pair of nodes between which to route a connection and one or more convex hulls grouping other nodes in the graph into compound obstacles. The system computes a visibility graph that avoids the complex hulls and connects the pair of nodes. The system may receive the set of convex hulls as a KD-tree as described further with reference to FIG. 3.

Continuing in block 420, the system receives a cone angle across which to sweep cones to identify boundaries and obstacles for producing a visibility graph. The cone angle selected is a tradeoff between routing accuracy (e.g., finding an optimal shortest path) and computational complexity. Larger angles will reduce the amount of time spent searching but will produce paths that are less precise. Smaller angles will allow for more in-depth searching to find a better path, but will increase the search time. Testing in one experiment showed that for a large graph with 1,138 nodes and 1,458 edges using an angle of 10 degrees was reduced from 95 seconds to 43 seconds over a standard tangent-visibility graph method. Increasing the angle to 45 degrees further reduced the time to 34 seconds but increased the longest edge length by 7%. In some embodiments, the system receives the cone angle as a configuration parameter as difference applications of the system may prefer a different tradeoff between path accuracy and computation time.

Continuing in block 430, the system selects a cone sweep direction to begin cone spanning. For a particular received cone angle $\alpha$, the system will perform $\pi/\alpha$ line sweeps in different directions. The sweeps are used to detect obstacles that exist in various directions so that the system can select a routing direction without overlapping any obstacles. Continuing in block 440, the system searches within the selected cone sweep direction for any visible vertices. The system processes obstacle vertices in line-sweep order, searching inside cones of angle $\alpha$ for visible vertices.

Continuing in decision block 450, if the system identifies a visible vertex during the cone sweep, then the system continues at block 460, else the system continues at block 470. Continuing in block 460, the system creates an edge invisibility graph that includes the identified visible vertex and discards the cone. After block 460, the system continues at block 470 to continue processing vertices. Continuing in decision block 470, if there are more potential vertices in the selected cone sweep direction, then the system loops to block 440 to continue searching for vertices, else the system continues at block 480. Continuing in decision block 480, if there are more sweep directions over which to span cones, then the system loops to block 430 to select the next sweep direction, else the system continues at block 490.

Continuing in block 490, the system outputs a visibility graph that includes each of the visible vertices encountered during the cone sweeps. The system can use the visibility graph to route each edge in the input graph in a manner that avoids obstacles while keeping edge length reasonably short. After block 490, these steps conclude.

The following sections provide an example of an implementation of the edge routing system. Those of ordinary skill in the art will recognize variations from the described steps that can produce similar results without deviation from the scope of the system described herein.

The most expensive part of previous routing schemes is the $O(n^2 \log n)$ construction of the tangent-visibility graph over n nodes with convex boundaries. Therefore, the system herein provides a scheme for routing over simpler visibility graphs using a spatial partitioning scheme. The system replaces groups of nodes (especially those that are far from the end nodes of the edge being routed) with their convex hulls, thus reducing the number of obstacles to consider in construction of the visibility graph.

Figure 5:
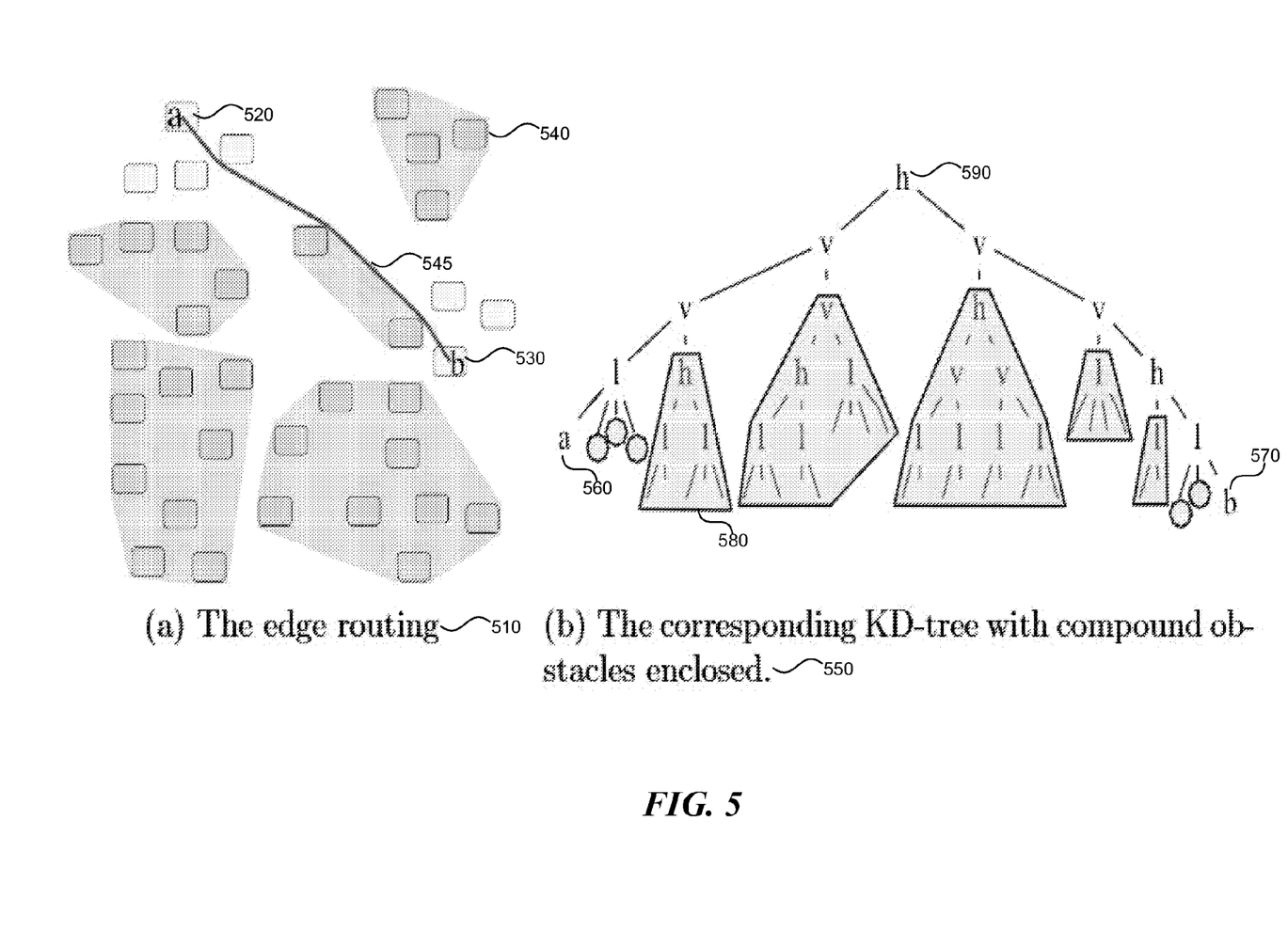
FIG. 5 is a block diagram that illustrates an edge routing through nodes grouped into complex hulls and a corresponding KD-tree, in one embodiment.

FIG. 5 is a block diagram that illustrates an edge routing through nodes grouped into complex hulls and a corresponding KD-tree, in one embodiment. This figure will serve as a background illustration for the discussion that follows. The figure includes a first visual depiction 510 of edge routing through a layout of nodes. The depiction 510 includes two nodes a 520 and b 530 between which a connection is to be drawn. The layout includes one or more determined convex hulls 540 that are illustrated as shaded regions around groups of nodes. The convex hulls 540 are treated by the system as virtual nodes around which to route edges. The resulting edge 545 shows a connection between node a 520 and node b 530 that does not overlap any individual node or complex hull.

The second depiction 550 illustrates a KD-tree data structure produced based on the layout of nodes shown in the first depiction 510. The letters in the second depiction 550 represent: 'h'—a horizontal split internal node, 'v'—a vertical split internal node, and 'l' a KD-tree leaf node. KD-trees work by spatially dividing a group of nodes according to one or more vertical splits. Starting at the top 590 of the illustrated tree, the layout was initially split horizontally (because the layout is taller than it is wide), then vertically, and so on until what is left is the leaf node a 560 and leaf node b 570, along with other leaf nodes in the same branch and convex hulls in between, such as convex hull 580.

The system performs a recursive spatial partitioning of the nodes such that the convex hulls of the nodes in each partition are not overlapping with their siblings in the partition hierarchy. To be precise, recursive application of a spatial partitioning to nodes positioned in the plane gives a tree structure where each tree node at level k in the tree has children on level k+1. The function desc(T) denotes the set of all leaf nodes (the original nodes in the graph) that are contained in a particular tree node T. For any tree node U at level k in the tree, the convex hull of desc(U) does not overlap with the convex hull of desc(V) for any other tree node V also at level k, i.e. a sibling of U.

In order to achieve a reasonable asymptotic complexity, the system produces a balanced tree. Obtaining such a tree for a given arrangement of nodes can be difficult at the outset. However, by allowing a little adjustment of node positions then the system can enforce separation of siblings in a balanced KD-tree partitioning.

The spatial-decomposition routing scheme begins with a starting configuration of nodes obtained with any layout algorithm (e.g., a fast-force directed approach). The bounding boxes of nodes can be initially overlapping as overlaps are removed as described further herein. The system builds a KD-tree structure for these initial node positions as follows.

FIG. 5 shows an example of routing around simplified convex hulls and the KD-tree used to generate this routing. The KD-tree has internal nodes and leaf nodes, where an internal node has two child KD-tree nodes and a leaf node has two copies of the list of nodes from our original graph, one sorted by x-position, the other sorted by y-position. The system builds the KD-tree by initially constructing a single leaf node with lists containing all original graph nodes. The system then recursively splits the leaves either horizontally or vertically across the median element in the appropriate sorted list, and inserts a new internal node as parent of these new leaves in the emerging hierarchy. In some embodiments, the system elects a horizontal split if the bounding box of the elements in the leaf node is wider than tall, and vice versa otherwise, in order to keep the aspect ratios of leaf bounding boxes roughly square. The system continues splitting until leaves are all smaller than some arbitrary bucket-size B. Initially sorting the n graph nodes by x and y position takes O(n log n) time. The sortedness of lists for new leaf nodes can be maintained by copying them in order from their parents. The tree is balanced since by splitting across the median element, so O(log n) splits are performed. Thus, construction of the KD-tree is performed in O(n log n) time.

The routing scheme expects that nodes in the KD-tree do not overlap their siblings. The system first removes overlaps between the B children of each leaf node in the KD-tree, i.e. the original graph nodes. A number of methods for effectively resolving overlaps between rectangular bounding boxes exist. One example is to use the quadratic-programming based method since it leads to relatively little displacement of nodes from their starting positions.

Next, the system removes overlaps between the bounding boxes of the children of internal nodes. Each internal node i has two children as the result of a split. If the split was horizontal then the system resolves overlap horizontally. That is, if the amount of horizontal overlap $o_h$=rightSide(leftChild(i))−leftSide(rightChild(i))>0, then we translate leftChild(i) by −$o_h$/2 and rightChild(i) by $o_h$/2. The system resolves overlap in the same manner vertically if i was constructed with a vertical split. All internal nodes are processed in this way, proceeding bottom-up. Since the system moves each (graph) node up to log n times, the running time of overlap removal is O(n log n).

The next step is to compute convex hulls around the descendants of each internal node. Again, this is computed bottom up. It is possible to compute the convex hulls of all internal nodes in the KD-Tree in O(n log n) total time using the linear time hull merging method known in the art. However, in some embodiments, the system uses a naive application of Graham Scan to calculate internal node hulls of the points in child hulls in O(n log 2n) total time since the overall complexity of edge routing is dominated by the computation of visibility graphs anyway. In the sequel, hull(i) refers to the pre-computed convex hull of internal node i.

Using the KD-tree of non-intersecting convex hulls described above the system can construct a simplified visibility graph for all edges between a particular pair of leaves. Procedure leaf_obstacles returns a list of obstacles for any two leaves u and v in the KD-Tree T.

```
leaf_obstacles(u,v,T)
    U ← the set of nodes of the shortest path between u and v
    w ← the lowest common ancestor of u and v
    H ← {hull(sibling(i))|i ∈ U\{u,v,w}}
    return H ∪ {hull(c)|c ∈ children(u) ∪ children(v)}
```

Where sibling(i) returns the sibling of internal node i and children(u) returns the original graph nodes that are children of leaf node u. Procedure leaf_obstacles returns O(log n) obstacle hulls.

To route edges, the system first groups edges by the (unordered) pair of leaves in KD-Tree T of their end nodes. For each group of edges between KD-Tree leaves u and v the system generates the visibility graph over leaf_obstacles(u,v, T). This takes time O($\log^2$ n log log n).

Although the system can use several approaches to produce a visibility graph from the KD-tree, an alternative approach for edge routing in a large graph uses so-called Yao graphs that are built by using fans of cones. A fan of cones is constructed at each vertex of an obstacle and only one edge of the visibility graph is chosen per cone. The resulting spanner graph contains only $$O\left(\frac{\pi n}{\alpha}\right)$$

edges where n is the number of vertices of the graph and α is the cone angle. In spite of the graph sparseness, for every ϵ>0 one can choose angle α such that for each shortest path in the full visibility graph the length of the corresponding shortest path in the spanner is at most (1+ϵ) of the length of the former. The system constructs the spanner graph by a direct method rather than building a conic Voronoi diagram first.

The technique presented here is a sweepline algorithm. One sweep finds edges inside cones constructed with the inner angle α and the bisector pointing to the direction of the sweep. By performing π/α sweeps, the system covers all possible edge directions from 0 to π. The input for the algorithm is the set P of convex mutually disjoint polygonal obstacles, the angle α, and a vector representing the cone bisector direction (sweep direction). A vertex u is visible from vertex v if u≠v and the line segment uv does not intersect the interior of a polygon in P. This way the neighbor vertices of an obstacle are visible to each other, and a side of an obstacle can be taken as an edge of the visibility graph. For the sake of simplicity, the following explanation assumes further that the bisector coincides with the vector (0, 1) and therefore the sweepline is horizontal and processing is from bottom to top. For points a=($a_x$, $a_y$) and b=($b_x$, $b_y$) the cone distance between them is |$b_y$−$a_y$|. Let V be the set of the vertices of P. For v∈V we denote by $C_v$ the cone with the apex at v, bisector (0, 1), and angle α and we denote by $Vis_v$ the set of vertices from V∩$C_v$ which are visible from v. For each v∈V with $Vis_v$≠∅ the algorithm finds u∈$Vis_v$ which is closest to v in the cone distance, and adds the edge (v, u) to the spanner graph.

Figure 6:
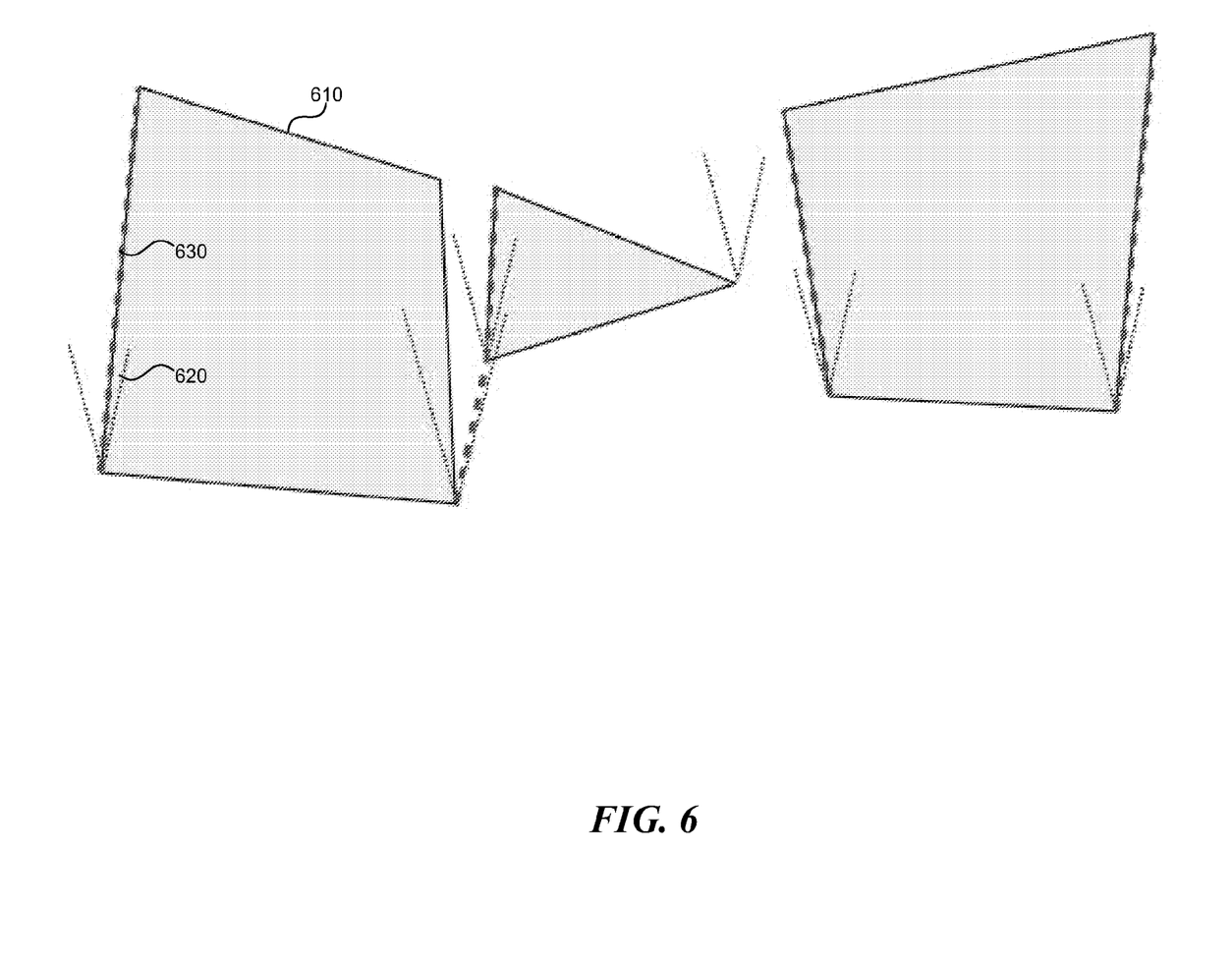
FIG. 6 illustrates edges created by one sweep during cone spanning, in one embodiment.

FIG. 6 illustrates edges created by one sweep during cone spanning, in one embodiment. For each shape 610 created by the nodes and convex hulls, the cones 620 illustrate a cone sweep performed at each vertex. The dashed lines 630 illustrate edges created by one sweep.

The algorithm works by processing events as the sweepline moves up. There are the following types of events: 1) lowest vertex at the leftmost lowest vertex of an obstacle; 2) left vertex at a vertex that can be reached by a clockwise walk on obstacle edges starting from the vertex of a lowest vertex event and stopping at the rightmost highest vertex; 3) right vertex at a vertex that can be reached by a counterclockwise walk starting at the vertex of a lowest vertex event and stopping at the vertex before the rightmost highest vertex; 4) left intersection at the lowest intersection of a left cone side and an obstacle; 5) right intersection at the lowest intersection of a right cone side and an obstacle; and 6) cone closure see below.

Figure 7:
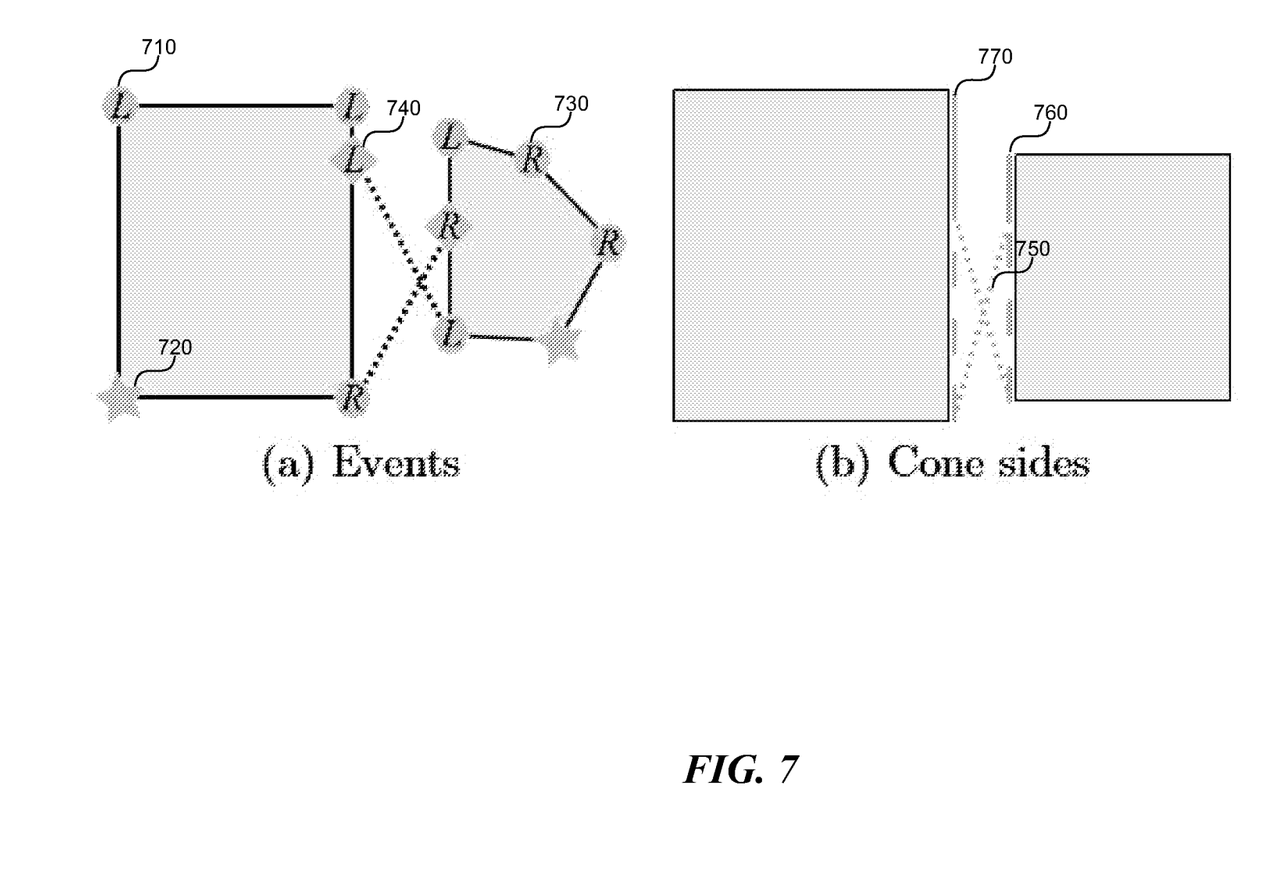
FIG. 7 illustrates types of sweepline events in further detail, in one embodiment.

FIG. 7 illustrates types of sweepline events in further detail, in one embodiment. Stars 720 are lowest vertex events, circles labeled L 710 and R 730 are left and right vertex events (respectively), and diamonds 740 labeled L and R are left and right intersection events. Dotted lines 750 show the default cone sides. Dashed lines 760 show broken cone sides that are created at vertex events. Solid lines 770 show broken cone sides that are created at intersection events.

Events are kept in a priority queue Q with those sited at the lowest y-coordinate taking highest priority. For each cone participating in a sweep, the system keeps pointers to its left and right sides. A cone side can be a default cone side, i.e. a ray starting at the cone apex at angle $$\pm \frac{\alpha}{2}$$

to the y-axis, or it could be a ray along an obstacle side if the cone is partially obscured by the obstacle as demonstrated in FIG. 7. Such a cone side is called a broken side. A cone closure event is an event happening when a broken side intersects a default cone side of the same cone. For a broken side the system keeps a pointer to its default cone side.

Figure 8:
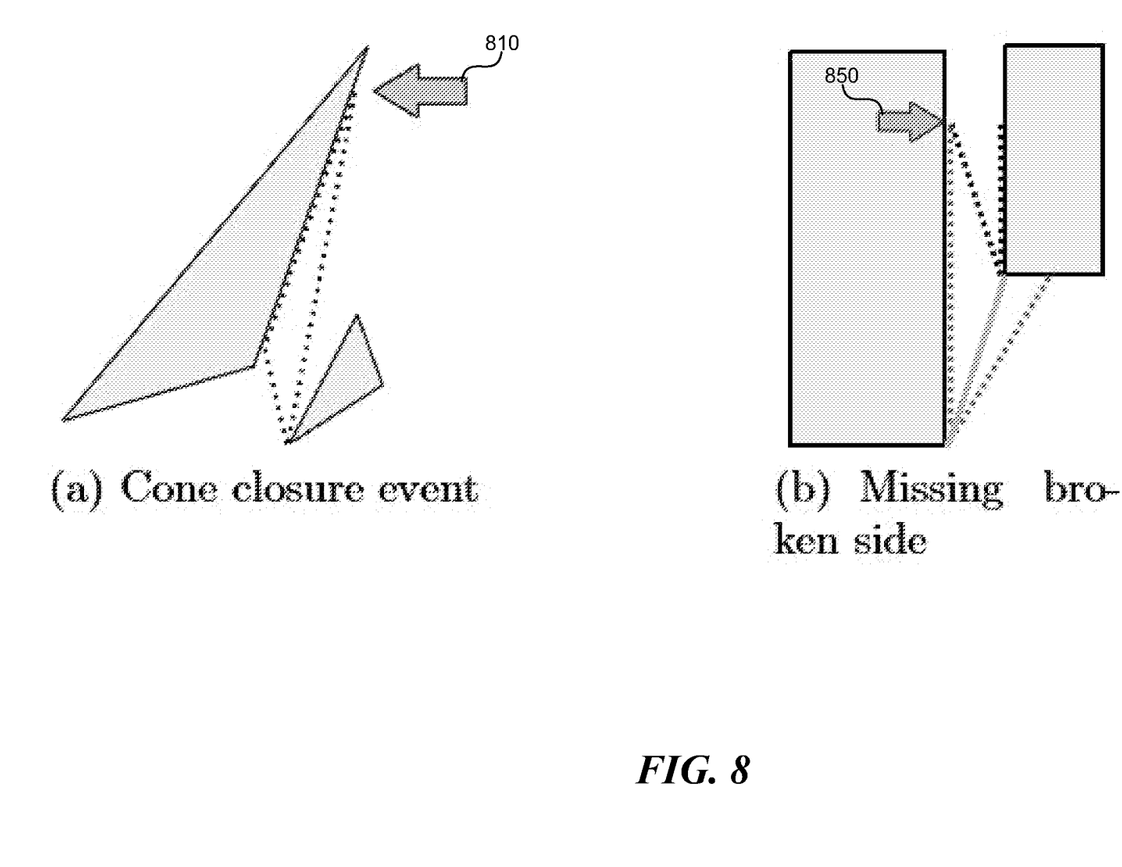
FIG. 8 illustrates cone closure events and missing broken sides, in one embodiment.

FIG. 8 illustrates cone closure events and missing broken sides, in one embodiment. The left diagram illustrates a cone closure event 810 that occurs when a broken side intersects a default cone side of the same cone. The right diagram illustrates a missing broken side event 850.

During the sweep, the system maintains a set of active cones. An active cone with its apex at a vertex is constructed at the vertex event. It is discarded when completely obstructed by an obstacle or when a visible vertex is discovered inside of the cone. The system keeps left cone sides of the active cones in a balanced tree LCS, and their right cone sides in a balanced tree RCS. The processing order guarantees that no two default active left (right) sides intersect. It is also known that the cone side searched for, inserted into, or removed from the tree intersects the sweepline. This allows defining the following order between cone sides a and b where x is the intersection of a with the sweepline. If x is to the left of b then a<b, else if x is to the right of b then a>b. Otherwise, if a and b are both broken sides, then the system compares the default cone sides they point to, else the system is comparing a broken side and a cone side; in LCS the default left cone side is less than the broken cone side, and in RCS the default right cone side is greater than the broken side. When looking for element a in a tree, inserting, or removing the element, the system only needs to compare a with elements of the tree.

Trees LCS and RCS serve to find active cones "seeing" a vertex. Another function of the trees is calculation of intersection events. However, as shown in FIG. 8, a broken side containing an intersection event 850 site can be removed before the intersection is found. To work around this the system maintains two additional balanced trees called LS and RS. The members of these trees are called active obstacle segments; they are line segments connecting two adjacent vertices of an obstacle that are intersected by the current sweepline. Members of LS are segments traversed on the clockwise walk from the lowest vertex to the top of the obstacle and the remaining obstacle segments are members of RS. An active segment is added to the tree when its low vertex is processed and removed when its top is processed. Elements of LS (RS) are called left (right) active segments. The order of the segments in LS and RS is defined by the x-coordinates of the intersections of the segments and the sweepline. A segment is called almost horizontal if the absolute value of the difference between the y-coordinates of its start and end point is less than some small positive E set in advance. Almost horizontal segments are not included in LS and RS since their intersections with the sweepline are not well defined, since the system assumes that the sweepline is horizontal. The order is well defined since the obstacles are disjoint.

The main loop of the algorithm is described below.

```
Sweep (P,α,bisector)
    initialize queue Q by all lowest vertex events
    while Q is not empty
        e ←pop event from Q
        ProcessEvent(e)
```

Routine ProcessEvent proceeds according to the event type. If the event is a cone closure then the system discards the cone. However, it can happen that the cone of a cone closure event has been discarded earlier when a visible vertex was found inside the cone. To handle this, the system keeps a Boolean flag associated with a cone and sets the flag to true when the cone is removed. In the case of a cone closure event if the flag is not set the system removes the cone; that is, its left and right sides are removed from LCS and RCS respectively.

We describe in detail only the event handlers LeftVertexEvent and LeftIntersectionEvent since other events are symmetric, with the exception of lowest vertex, which is described below.

```
LeftVertexEvent(e)
    move the sweepline to the site of e
    FindConesSeeingEvent(e)
    CloseConesByHorizontalSegment(e)
    remove from LS the segment incoming into e clockwise
    AddConeAtLeftVertex(e)
```

The procedure FindConesSeeingEvent finds all cones that "see" the site of e, creates the corresponding edges, and discards the cones.

```
FindConesSeeingEvent(e)
    b ←the first right cone side in RCS which is not to left of e
    if b exists
        a ←the left side of the cone of b
        while a is defined and a is not to the right of e
            create the edge from the apex of the cone of a to the
vertex and remove the cone
            a ←the successor of a in LCS
```

Procedure CloseConesByHorizontalSegment handles the case when the obstacle side going clockwise and ending at the vertex of event v is almost horizontal. It finds all cones obstructed by the segment. Since by this time the system has removed all cones "seeing" v or "seeing" the start of the segment, every cone with a side intersecting the segment is completely obstructed by it. Tree RCS, for example, can be used to find all such cones in an efficient manner.

In AddConeAtLeftVertex, the system tries to create a cone, enqueue events, and add a segment to LS. Let v be the vertex of e, and u is the next one on the obstacle in the clockwise order. The system enqueues a left vertex event for u if it is not below v. The cone is created at v only when it is not completely obscured by the obstacle. The left side of the cone is a default side: for this side the system looks for the intersection with the last segment of RS to the left of v. If the right cone side is a default cone side, we look for the intersection of it with the first segment of LS to the right of v. If the right side of the cone is an obstacle side, the system checks for its intersection with the last segment of RCS which is to the left of v. If the cone is created, the system adds new cone left (right) side to LCS (RCS). If the segment [v, u] is not almost horizontal and points to the left of the default right cone side starting from v, then the segment is added to LS as a left active segment. An obstacle segment that does not point to the left of the default right cone side is not inserted into LS since no default right cone with the apex different from v can intersect it without first intersecting the obstacle at some other segment.

At a lowest vertex event, the system performs almost all the work of a left vertex event and a right vertex event. However, since the lowest vertex is the first one examined on the obstacle the system does not try to close cones by the horizontal obstacle segments adjacent to the vertex. When processing a right vertex event the system enqueues the next right vertex event only in the case when the segment from the event vertex to the next vertex going counterclockwise on the obstacle is not almost horizontal; this way the system avoids processing a top vertex of an obstacle twice.

LeftIntersectionEvent works as follows. This procedure deals with the intersection of a default left cone side and a right obstacle segment.

```
LeftIntersectionEvent(e)
    c←the cone side of e
    x←the intersection point of e
    s←the obstacle segment of e
    u←the top point of s
    if the cone of c is not removed
        if segment [x,u] is almost horizontal
            remove the cone of c
            move the sweepline to the event site
        else
            RemoveFromTree(c,LCS)
            move the sweepline to the event site
            t←new broken side [x,u]
            replace c by t in the cone and insert t into LCS
            m←the successor of t in LCS
            if m exists and intersects t
                enqueue the new left intersection event
            if t intersects the cone right side and the intersection point is below u
                enqueue a new cone closure event at the intersection point
```

RemoveFromTree, in most cases, trivially removes the cone side from the tree. However, it can happen that the sweepline passes through the intersection point of an intersection event before the system starts processing it. In this case, the removal might fail since the tree is not ordered correctly. A remedy is to lower the sweepline temporarily by some value (but not lower than the start of the cone side being removed), remove the cone side, and then restore the sweepline. The comparison of the cone sides still works since the lowered sweepline intersects the first cone side under comparison.

Let n be the number of vertices of obstacles from P. The number of events is O(n) since there are n vertices producing not more than n cones and each cone creates at most three events: two intersection events and one closure event. The trees do not have more than n elements each. Each search on the trees takes O(log n) steps. Operations "successor" or "predecessor" on the trees also take O(log n) steps. In FindConesSeeingEvent and in CloseConesByHorizontalSegment the system walks the tree by moving to the cone side successor until some condition holds. The system can potentially make O(n log n) steps per call. However, for each processed cone side the system removes the corresponding cone, so the routines cannot make more than O(n log n) steps during the whole algorithm run. Therefore the overall number of steps of the algorithm is O(n log n).

At the final stage of the routing algorithm, the system "beautifies" the spline. The detailed discussion of this stage is not described herein as it is well known in the art. However, on a very high level the system performs the following steps: shortcutting, relaxation, and fitting. In shortcutting, the system tries to skip each internal vertex of the shortest path by removing it and checking that the path still does not intersect the interior of an obstacle. Intersections are checked efficiently using a binary space partitioning. In relaxation, the system modifies the path in such a way that it does not touch the obstacles anymore. In fitting, the system inscribes cubic Bezier segments into the corners of the shortest path. Experimentally, the system spends only a fraction of the full routing time in refinement.

In some embodiments, the edge routing system reduces the work performed upon receiving a change to the diagram. For example, a user may move a node in a diagram containing thousands of nodes. Rather than recompute the entire layout, the system may store intermediate steps of the processing described herein (e.g., the previous KD-tree, visibility graph, and so forth), and determine a partial computation to perform to update the previous results based on the recent change. This allows the system to eliminate some redundant processing and produce edge routing results faster as the user works with the diagram.

In some embodiments, the edge routing system uses the techniques described herein in combination. The spatial decomposition and cone spanning techniques described herein can be used separately or in combination to produce faster edge routing results. For example, the cone spanning can be used on KD-tree blocks (e.g., convex hulls) to identify intersections and obstructions for constructing a visibility graph.

From the foregoing, it will be appreciated that specific embodiments of the edge routing system have been described herein for purposes of illustration, but that various modifications may be made without deviating from the spirit and scope of the invention. For example, although diagramming has been described, the concepts herein can also be applied to other fields, such as robot path planning which seeks to map the path of a robot around physical obstacles in the world. Accordingly, the invention is not limited except as by the appended claims.

We claim:

1. A computer-implemented method for performing fast edge routing for a graph in an interactive diagramming application, the method comprising:
  receiving a layout of nodes for which the edges are to be routed to avoid the nodes;
  performing spatial decomposition on the received layout of nodes to reduce a number of obstacles to consider during routing between each connected pair of nodes of the graph in the interactive diagramming application, wherein performing spatial decomposition comprises,
    creating a tree that holds each of the nodes in a received graph layout;
    after creating the tree, shifting nodes to eliminate overlap between node shapes, the nodes shifted no more than a threshold level of movement that places an upper bound on how far nodes can be moved;
    computing one or more convex hulls based on one or more groupings of nodes in the created tree; and
    selecting convex hulls for routing between each pair of leaves in the tree, wherein spatial decomposition further comprises,
  producing a visibility graph based on the reduced number of obstacles;

routing the edges of the graph in the interactive diagramming application to avoid the nodes in accordance with the produced visibility graph; and rendering the graph based on the layout of nodes and the determined routing of edges to display the nodes and edges to a user in a user interface of the interactive diagramming application, wherein the preceding steps are performed by at least one processor.

2. The method of claim 1 wherein receiving the layout of nodes comprises receiving the layout from the interactive diagramming application that is routing the edges for display to the user in the user interface.

3. The method of claim 1 wherein receiving the layout of nodes comprises receiving a layout with nodes positioned by an automatic layout algorithm.

4. The method of claim 1 wherein routing the edges comprises placing the edges in a path that does not intersect with any node boundary, and that approximates a shortest path through the graph.

5. The method of claim 1 wherein producing the visibility graph comprises using cone spanning to reduce the computational complexity of producing the visibility graph.

6. The method of claim 1 wherein creating the tree comprises creating a KD-tree that partitions the nodes into one or more partitions based on a binary division of the nodes by coordinates.

7. The method of claim 1 wherein creating the tree comprises storing a sorted list of nodes by coordinates in each dimension, and selecting a median node within the sorted list as the coordinate for partitioning the remaining nodes.

8. The method of claim 1 wherein creating the tree comprises creating a balanced KD-tree that provides one or more groupings of nodes based on their location within the graph.

9. The method of claim 1 wherein computing one or more convex hulls comprises identifying a larger virtual node that can be used for routing in place of one or more original individual nodes.

10. The method of claim 1 wherein computing one or more convex hulls comprises processing each of multiple KD-tree nodes in a bottom up manner to compute convex hulls around the boundaries of the constituent children.

11. The method of claim 1 wherein selecting convex hulls comprises producing a minimal set of visibility graph obstacles that include one or more convex hulls of nodes between the pair of leaves as well as any descendant leaves that are contained within the same branch as the pair of leaves.

12. A computer system for faster routing of edges for interactive diagramming of large numbers of nodes, the system comprising:

a processor and memory configured to execute software instructions embodied in the following components;

a layout input component configured to receive a layout for which to plan the routing of edges for connected nodes in a graph;

a tree building component configured to build a tree data structure that describes one or more relationships of nodes in the received layout;

a hull building component configured to group nodes so that construction of a visibility graph can consider groups instead of individual nodes to yield fewer obstacles and faster processing;

a node shift component configured to shift nodes in the graph to remove overlaps between groups generated by the hull building component, wherein a shift threshold is selected to allow for easier routing without significantly changing the visual appearance of the graph, wherein the shift threshold is a threshold level of movement that places an upper bound on how far a node can be moved;

a visibility graph component configured to produce a visibility graph over the remaining nodes and groups of nodes using cone spanning to produce a sparse visibility graph; and a routing output component configured to provide the resulting visibility graph to a renderer for displaying visual output of the routing process to a user of an interactive diagramming application.

13. The system of claim 12 wherein the tree building component is further configured to use a KD-tree that partitions a space by making a series of binary splits.

14. The system of claim 12 wherein the tree building component is further configured to partition nodes until each partition contains at most a specified threshold number of nodes.

15. The system of claim 12 wherein the tree building component is further configured to partition nodes by selecting a median element in a list of nodes sorted by x or y coordinates to produce a balanced tree.

16. A computer-readable storage memory comprising instructions for controlling a computer system to efficiently produce a visibility graph over a set of nodes, wherein the instructions, upon execution, cause a processor to perform actions comprising:

receiving a graph specification that includes at least one pair of nodes between which to route a connection and one or more convex hulls grouping other nodes in the graph into compound obstacles;

receiving a cone angle across which to sweep cones to identify boundaries and obstacles for producing the visibility graph;

selecting a cone sweep direction to begin cone spanning;

searching within the selected cone sweep direction for any visible vertices;

upon detecting a visible vertex, creating an edge invisibility graph that includes the identified visible vertex;

repeating the steps of selecting a cone sweep direction and searching within the selected cone sweep direction until each visible vertex is identified;

outputting the visibility graph that includes each of the visible vertices encountered during the cone sweeps;

determining routing edges using the visibility graph; and rending a graph in an interactive diagramming application based on the visibility graph and determined routing edges.

17. The memory of claim 16 wherein receiving the cone angle comprises receiving an angle value selected to tradeoff between routing accuracy and computational complexity, wherein larger angles reduce an amount of time spent searching but produce paths that are less precise.

* * * * *